(No Model.)

L. S. GOODRICH.
APPARATUS FOR PURIFYING GAS.

No. 345,132. Patented July 6, 1886.

WITNESSES
William H. Clarkson
M. M. McGuire

INVENTOR
Leven S. Goodrich
by Robt. M. Fryer
Attorney.

UNITED STATES PATENT OFFICE.

LEVEN S. GOODRICH, OF WARNER, TENNESSEE.

APPARATUS FOR PURIFYING GASES.

SPECIFICATION forming part of Letters Patent No. 345,132, dated July 6, 1886.

Application filed September 29, 1885. Serial No. 178,592. (No model.)

*To all whom it may concern:*

Be it known that I, LEVEN S. GOODRICH, of Warner, in the county of Hickman and State of Tennessee, have invented certain new and useful Improvements in Purifiers for Gases, of which the following is a specification.

The object of this invention is to produce an apparatus in which chemical action is aided by mechanical means to bring proportionately large quantities of gas into contact with lime or other suitable agent to free it from carbonic dioxide and other diluent gases, which may be thus absorbed.

The invention consists of a revolving chamber provided with diaphragms perforated in irregular order to cause the gas in its flow to become correspondingly diverted from any regular direction, whereby it is thrown in contact with portions of the agent, hereinafter described, at various points during its passage through the said chamber. The chamber is charged with lime and a sufficient amount of water to carry it along by gravitation as the chamber is revolved. This supply of lime and water being introduced at one end of the apparatus and discharged at the other by the natural flow from this gravitation, it is plain to be seen that the disagreeable work of handling lime, as when used in dry form upon trays in ordinary purifiers, is avoided.

Figure 1:
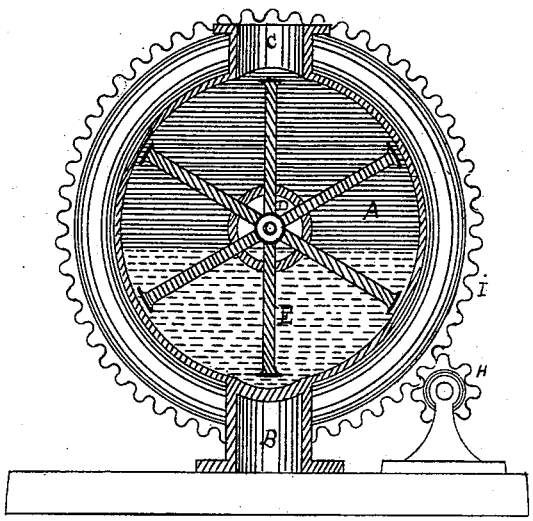
Figure 2:
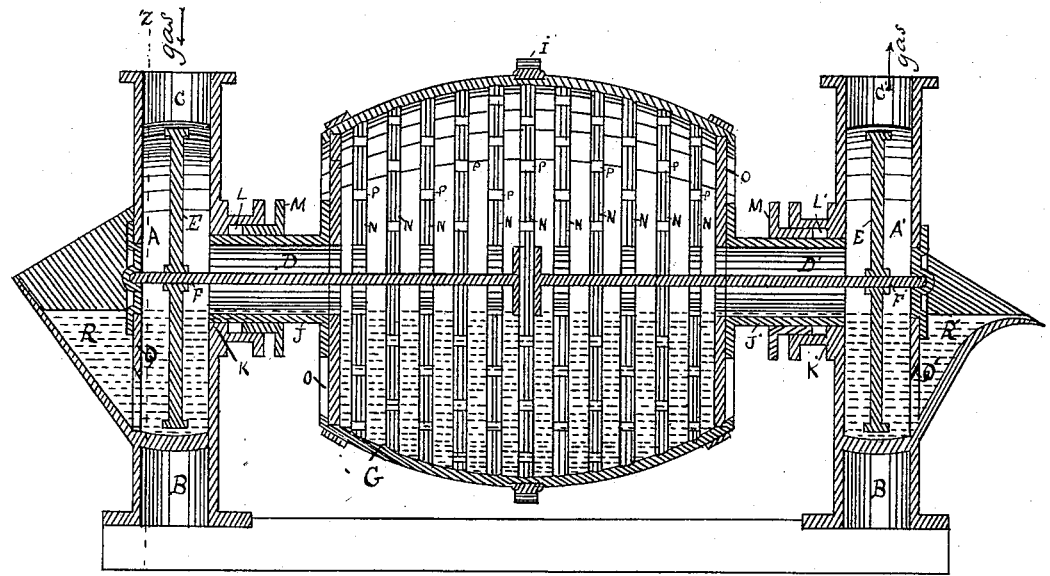

In my drawings, Figure 1 represents a vertical section of the apparatus through the line Z Z, Fig. 2.

Fig. 2 is a longitudinal section of the entire apparatus, wherein A represents a shallow cylindrical chamber, supported by a cylindrical leg, B, being preferably a part thereof, as shown. The said chamber A is provided with two openings, C and D, the former being at the top and the latter, D, leading off in right angular direction to the purifier, as hereinafter shown and described. In this view E E, &c., represent revolving arms attached to shaft F, which is operated by the center diaphragm. These arms are used to agitate the contents of A, which in practice is lime and water, so that as water is added an easy flow of the said contents is effected through the said passage D to the revolving chamber G, which is operated by pinion H and gearing I, as shown.

Fig. 2 represents a longitudinal section of the apparatus, wherein the revolving chamber G is supported by hollow trunnions J J', which rest in sockets K K', located in cylindrical chambers A A', and are provided with packing-chambers L L' and glands M M', whereby these joints are kept tight as against leakage, while the chamber G is permitted to revolve freely. Here it will be seen that the chamber G is provided with diaphragms N, which are perforated at intervals in irregular order with orifices P. To the center diaphragm is attached shafts F and F', which terminate at the other ends in sockets formed in the heads of chambers A A', preventing lateral motion of chamber G. Within the said chambers A A' the agitating-arms E E' are attached to shafts F and F', respectively, as shown, so that as the chamber G is revolved these arms revolve correspondingly.

At the outer portion of the chambers A A' there is provided a chamber, R or R', divided in part therefrom by the wall Q or Q', which forms a seal to prevent the leakage of gas, while lime and water, which are fed in at one of these chambers, are allowed to flow into and through chambers A, G, and A', and out through R' to the open air; hence all that is necessary in the operation of this apparatus for the purification of gas is to cause the said gas to enter at pipe C and pass off through pipe C', or vice versa, while the chamber G and its connections shown are made to revolve, the lime being shoveled in at chamber R, and water being supplied in sufficient quantities at said chamber R to gradually carry it off by gravitating through the orifices P in the diaphragms N, which, by their rotation, agitate the solution or mixture, bringing the same in contact with the gas, which is also made to pass through the same orifices in either direction desired, whereby the contact portions of both bodies are of the most minute particles obtainable in practice. The agitation and intermixing is governed by the velocity of the revolutions of the parts named, while the quantity of lime used is governed by the amount of gas to be purified; and here let it be stated that the chamber R can be extended so as to contain lime enough to last for several days, regulating the water-supply to move off a sufficient quantity of the lime for purification, and as this solution can only reach a given consistency the regulation of this water-supply once properly gaged renders the apparatus automatic in its operation for all time. In other words, the lime has only to be shoveled in at long intervals, the supply of water regulated, and the operation of providing for the necessary discharge of the spent material at the end, as shown.

I have used in this description as a purifying agent only lime, because of its convenience and cheapness; but as a matter of course I do not confine myself to the use of that substance in the apparatus described.

What I here claim, and desire to secure by Letters Patent of the United States, is—

1. In a purifier for gases, the combination, with a revolving cylinder or chamber, of two supporting-chambers for the hollow trunnions thereof, as shown, the said supporting-chambers being provided at the top with openings for the passage of gas to or from the revolving chambers, and at the bottom with a chamber which extends outside of main chamber, as shown, divided by a bridge-wall to prevent leakage of gas, and to admit of charging or discharging lime or water to and from the chamber, substantially as set forth.

2. In a purifier of gases, the combination of revolving chamber G, diaphragms N, trunnions D D′, stuffing-boxes L L′, chambers A A′, agitating-arms E E, and shaft F, chambers R R′, diaphragm or bridge-wall Q′ Q′, and passages C C′, substantially as described, for the purpose set forth.

In testimony whereof I hereunto set my hand in presence of two witnesses.

LEVEN S. GOODRICH.

Witnesses:
W. H. CRANFORD,
H. B. COOPER.